Figure 1:
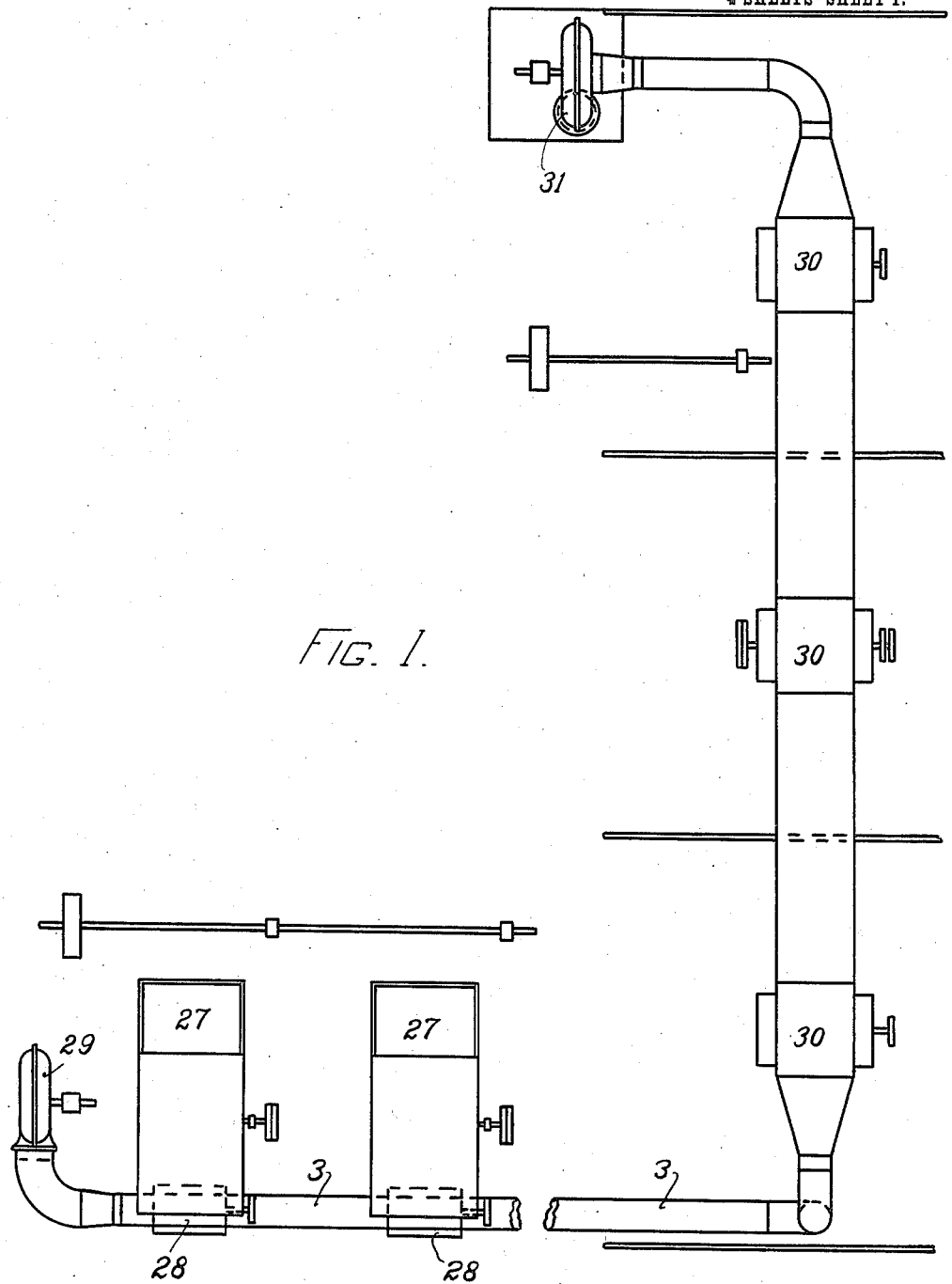

H. C. PERHAM, DEC'D.
C. A. PERHAM, EXECUTRIX.
COTTON CONVEYING APPARATUS.
APPLICATION FILED MAY 8, 1905.

1,092,857.

Patented Apr. 14, 1914.
4 SHEETS—SHEET 2.

H. C. PERHAM, DEC'D.
C. A. PERHAM, EXECUTRIX.
COTTON CONVEYING APPARATUS.
APPLICATION FILED MAY 8, 1905.

1,092,857.

Patented Apr. 14, 1914.
4 SHEETS—SHEET 3.

H. C. PERHAM, DEC'D.
C. A. PERHAM, EXECUTRIX.
COTTON CONVEYING APPARATUS.
APPLICATION FILED MAY 8, 1905.

1,092,857.

Patented Apr. 14, 1914.
4 SHEETS—SHEET 4.

UNITED STATES PATENT OFFICE.

HAVEN C. PERHAM, OF LOWELL, MASSACHUSETTS; CLARA A. PERHAM, OF LOWELL, MASSACHUSETTS, EXECUTRIX OF SAID HAVEN C. PERHAM, DECEASED, ASSIGNOR TO KITSON MACHINE SHOP, OF LOWELL, MASSACHUSETTS, A CORPORATION OF MASSACHUSETTS.

COTTON-CONVEYING APPARATUS.

1,092,857. Specification of Letters Patent. Patented Apr. 14, 1914.

Application filed May 8, 1905. Serial No. 259,308.

*To all whom it may concern:*

Be it known that I, HAVEN C. PERHAM, a citizen of the United States, residing at Lowell, in the county of Middlesex and State of Massachusetts, have invented certain new and useful Improvements in Cotton-Conveying Apparatus; and I do hereby declare the following to be a full, clear, and exact description of the invention, such as will enable others skilled in the art to which it appertains to make and use the same.

The present invention relates to improvements in cotton conveying apparatus.

In cotton mills it is customary to convey the raw cotton from the storeroom to the picker room through a pneumatic conveyer, comprising a tube and means for creating a current of air through the tube, the cotton being carried through the tube by the air. At the delivery end of the pneumatic tube the cotton is separated from the current of air by a device called a condenser. The means for creating the draft of air comprises either a blower at or near the storeroom for forcing air through the tube or an exhauster located in or near the picker room for sucking air or inducing a current of air through the tube or both a blower at one end and an exhauster at the other end, the blower and exhauster being, usually, similar machines, the one operating to force a current of air into the tube and the other operating to exhaust the air from the tube, and commonly of the familiar centrifugal type. The cotton, as taken from the bales, is put into the feeder (or feeders) which disintegrates the mass and delivers the fiber uniformly to the pneumatic tube. The general practice has been to provide openings or an opening in the tube through which the cotton from the feeders falls into the tube, either directly through several individual openings in the tube or indirectly, through the medium of a traveling apron which collects the cotton from the several feeders and discharges it into the open end of the tube, the air and cotton passing first through the blower (in the case where a blower is employed at the opening-room end) and then through the tube to the picker room, the blower creating an indraft of air at the end of the tube or at the several openings through which the cotton is introduced into the tube. This arrangement is defective because, in the case where each feeder discharges through an individual opening into the tube, of the great capacity of the tube and blower required in order to handle the amount of air necessarily admitted through the several openings. This excessive size of tube and blower has set a practical limit on the number of feeders in use, three being rarely exceeded. Both this construction in which each feeder discharges through a separate opening into the tube and the construction in which the several feeders discharge on an apron which carries the cotton to the open end of the tube are objectionable because of the passage of cotton through the blower, which incurs a risk of fire arising from sparks from bits of metal or stone struck by the rapidly moving blower, which sparks frequently ignite the cotton passing therethrough.

One object of the present invention is to produce a conveying apparatus having improved means for introducing the cotton to the pneumatic tube, by which the disadvantages above referred to will be obviated, and to this end the invention contemplates a cotton conveying apparatus comprising a device by which cotton may be introduced into the pneumatic tube at any point without the ingress or escape of air through the introducing device, the device being arranged to introduce the cotton without at any time affording a passage between the pneumatic tube and the atmosphere. It will be apparent that if such a device be used at each feeder the number of feeders which may deliver into the tube will be limited only by the conveying capacity of the tube, since the current of air will not be diminished at any point but will be as strong at the end of the tube as at any other point. Furthermore, since the cotton-introducing device is mechanical in its operation and does not depend upon suction, it may be arranged to deliver cotton at any point in the pipe, and in the preferred embodiment of the invention the cotton-introducing devices are located between the blower and the main portion of the pipe, so that no cotton passes through the blower, and thus the risk of fire above referred to is entirely obviated.

As several grades of cotton are often used in the same factory it is necessary to provide separate bins in the picker-room, and each bin is provided with a condenser.

A further object of the invention is to arrange the several condensers in connection with the conveyer tube and the exhauster so that the condensers may act in a manner analogous to that in which the cotton introducers act, and to this end the condensers are arranged in a series along the conveyer tube, each condenser being connected with the tube at both inlet and exhaust, and each condenser may be used to extract cotton from the conveyer tube without diminishing the current of air therein, so that the air flows in undiminished volume to the end of the tube, where it may be exhausted by the exhauster. By this arrangement duplication of exhausters or of exhaust passages from the condensers is obviated, the conveyer tube itself forming both the exhaust tube and the supply tube for each condenser.

By the use of the cotton introducers and the improved condensers in the manner above described a conveying system may be produced in which cotton may be introduced and extracted at any points in a pneumatic conveyer comprising merely a single tube, while the means for creating a current of air in the conveyer tube may be located at any point in the tube, either at one or both extremities or at any intermediate point.

Other objects and features of the invention will be apparent from the description of the illustrated embodiment thereof.

Figure 2:
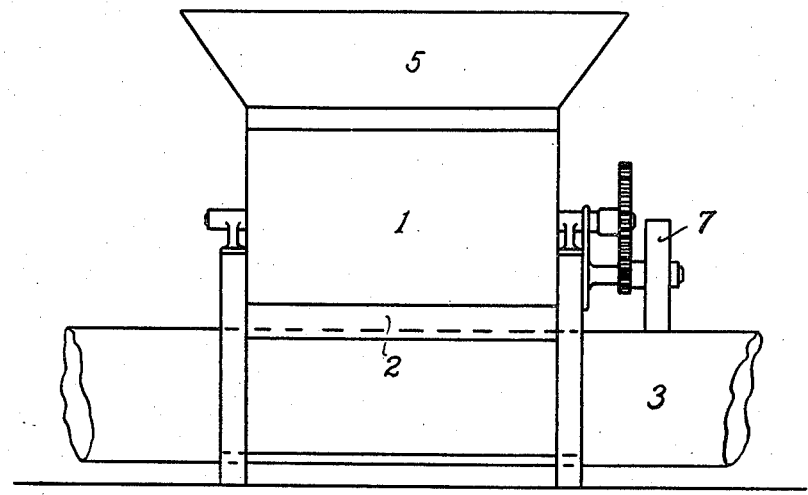
Figure 3:
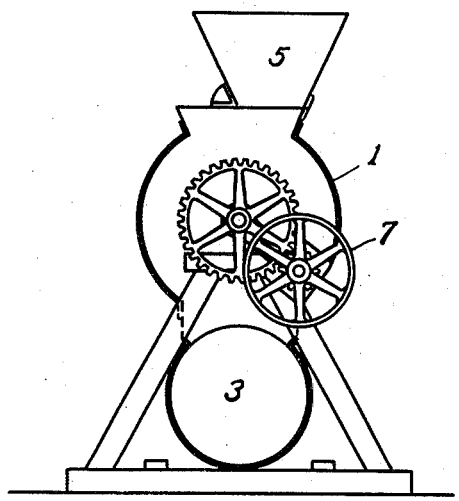
Figure 4:
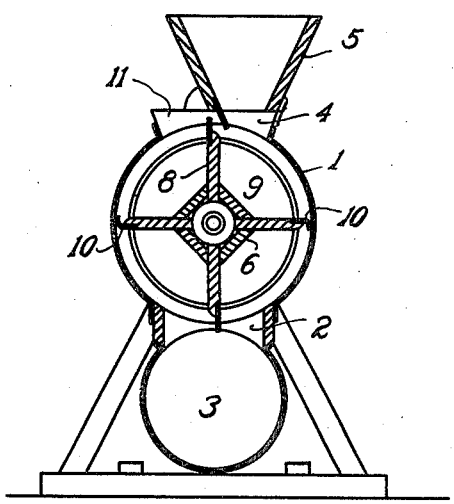
Figure 5:
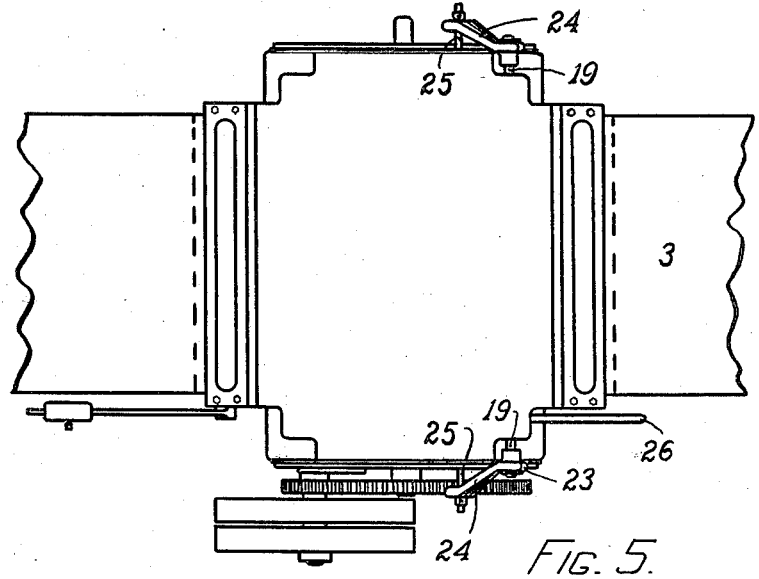
Figure 6:
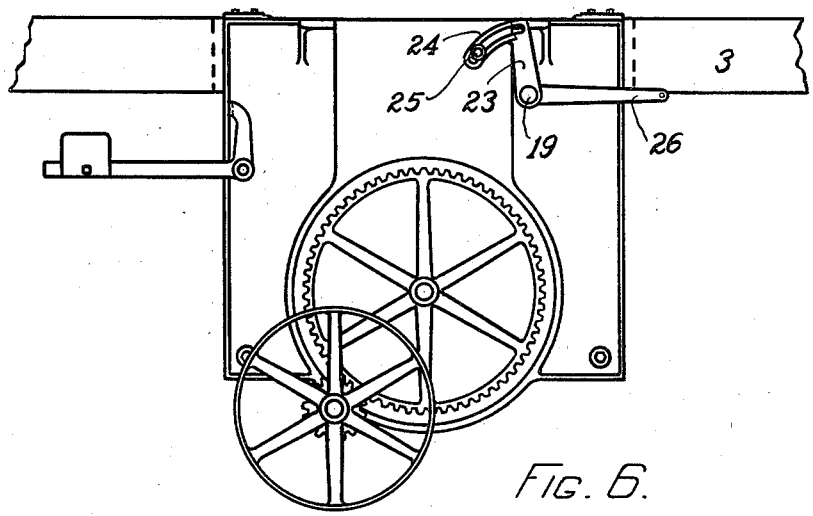
Figure 7:
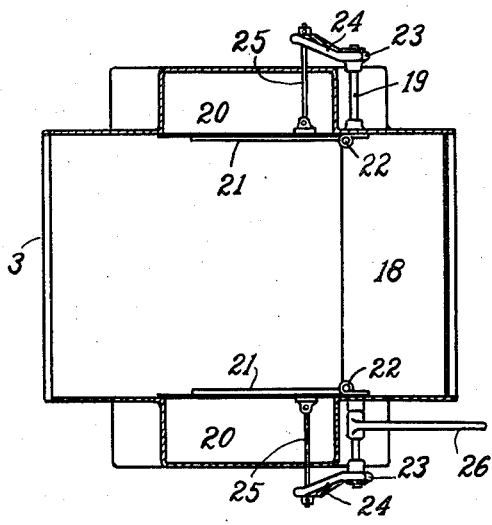
Figure 8:
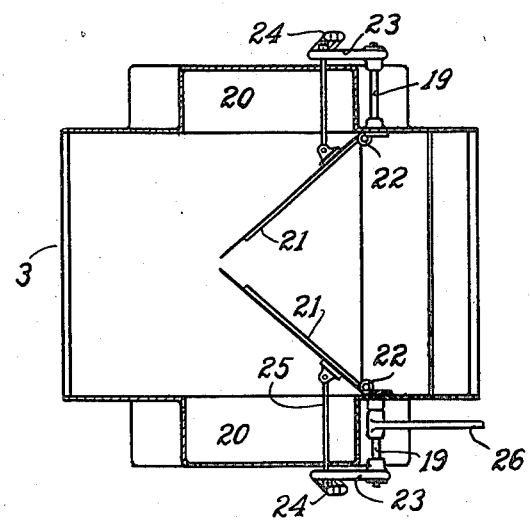
Figure 9:
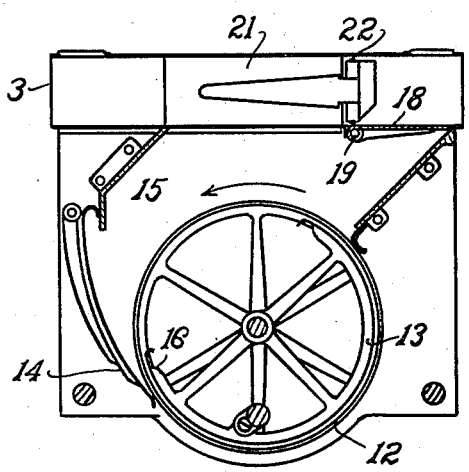
Figure 10:
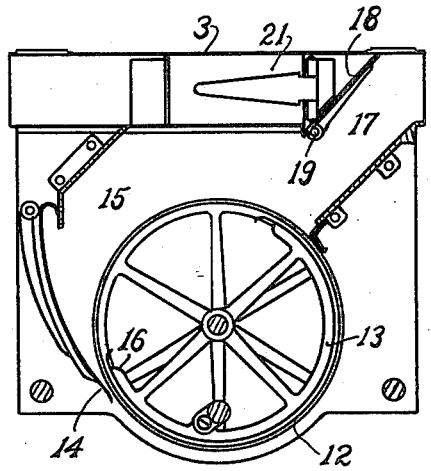

In the drawings Figure 1 is a diagrammatic plan of a cotton conveying apparatus embodying the present invention in its preferred form. Fig. 2 is a side view of the device for introducing cotton into the pneumatic tube. Fig. 3 is an end view and Fig. 4 is a sectional view of the same device. Fig. 5 is a plan view of one of the condensers, and Fig. 6 is an end view of the same. Figs. 7 and 8 are horizontal sections of the condenser in inoperative and operative positions respectively, and Figs. 9 and 10 are vertical sections corresponding to Figs. 7 and 8 respectively.

The illustrated embodiment of the invention is constructed as follows:—The device for introducing the cotton into the pneumatic tube, as shown in Figs. 2, 3 and 4 comprises a casing 1 of generally cylindrical form, which has at the bottom an outlet 2 connecting it with the pneumatic conveyer tube 3, and an inlet 4 at the top connected with a hopper 5 into which the cotton is introduced by the feeder. A rotary member 6 is journaled to rotate in the casing 1 and is actuated by gears and a pulley 7 connected with a suitable source of power. The rotary member 6 comprises flat plates 8 provided with end boards closely fitting the casing 1, forming between them four pockets 9 for the reception of cotton. The edges of the plates 8 are provided with leather flaps 10 to cause them to fit air-tight in the casing. The cotton in the hopper falls into the uppermost of the pockets 9 and is thence carried around and down until it is opposite the outlet 2 through which it falls directly into the pneumatic tube. The upper part of the casing 1 is provided with a chamber 11 which permits any cotton drawn over the edge of the uppermost plate 8 to fall into one of the adjacent pockets. As one or more of the plates 8 is always in position to intercept passage of air between the inlet 4 and the outlet 2 no air can escape through the introducing device when it is connected with the portion of the pneumatic tube in which the air is under pressure, and conversely, no air can enter the pneumatic tube through the introducing device when the latter is connected with the pneumatic tube at a point where suction occurs in the tube.

The condensers are, in general construction and mode of operation, of a familiar type, comprising a rotary perforated drum 12, an air shield 13, a swing board 14 and a suitable air chamber 15 in which the drum 12 is journaled to rotate. Air and cotton are admitted to the chamber 15 from the pneumatic tube and air is exhausted from the ends of the perforated drum 12. The drum is rotated in the direction of the arrow. The air in its passage through the drum is freed from cotton which adheres to the surface of the drum until it passes underneath the swing board 14. The cotton is then free to drop into the bin since the air shield 13 interrupts the suction through the drum after the cotton has passed the forward edge 16 of the damper.

The novel construction of the condenser consists in the air passages connecting both the inlet and the exhaust of the condenser with the pneumatic tube, and in the means for opening and closing these passages. The conveyer tube 3, which at this point is in the form of a rectangular trunk, passes directly over the air chamber 15. The air chamber is connected with the conveyer tube by an inlet opening 17 in the bottom of the tube controlled by an inlet gate 18 fixed to a rock shaft 19 journaled in the casing of the condenser. The open ends of the perforated drum 12 are connected by lateral exhaust passages 20 with the pneumatic tube, the ends of the exhaust passages being controlled by exhaust gates 21 journaled to swing about vertical axes 22 in the casing. In order to actuate the inlet gate 18 and the exhaust gates 21 simultaneously, the rock shaft 19 is provided with arms 23 having curved slotted extensions 24 forming cam surfaces which engage headed rods 25 passing through the sides of the exhaust passages and pivotally connected with the exhaust gates 21. The rock shaft 19 is also provided with a hand lever 26. When the hand lever is moved to the position of Figs. 5, 6, 7 and 9 the inlet gate 18 closes the inlet passage 17 and the exhaust gates 21 close the exhaust passages 20 and a free passage is afforded through this portion of the conveyer tube, the condenser being out of operation. With the parts in this position the condenser is entirely shut off from the conveyer tube and no leakage of air can occur through the condenser. When the hand lever is raised to the position of Figs. 8 and 10 the inlet gate 18 is raised so as simultaneously to open the inlet passage 17 and close the conveyer tube, so that the current of air and cotton is deflected downward into the air chamber 15, and by the same movement of the hand lever, through the operation of the arms 23 and the mechanism above described, the exhaust gates 21 are permitted to swing inward so as to open the exhaust passages 20.

Owing to the arrangement above described of the condensers and their passages, it is unnecessary to provide a separate exhaust passage for each condenser, since when any one of the condensers is in operation the portion of the conveyer tube subsequent to that condenser operates as the exhaust pipe for the condenser, and a single exhauster at the end of the conveyer tube serves for all of the condensers.

The preferred arrangement of the entire conveying apparatus is shown diagrammatically in Fig. 1. Here the feeders 27, which may be of any usual or suitable form, deliver cotton into the introducing devices 28, which are connected with the pneumatic tube 3 at points between the blower 29 and the delivery end of the tube so that no cotton passes through the blower. The condensers 30 are arranged successively along the conveyer tube and the exhauster 31 is connected with the end of the conveyer tube. A feeder may be placed at any point on the conveyer tube between the blower 29 and the condenser designed to collect the cotton delivered by such feeder, since the cotton-introducing devices are capable of operating regardless of the pressure in the conveyer tube; and similarly, a condenser may be placed at any point on the conveyer tube subsequent to the feeder from which it is to receive cotton, since no exhaust passage other than the conveyer tube itself is required for the condenser.

It is, of course, to be understood that there is more or less leakage of air from or into the pneumatic conveyer tube, introducers and condensers, and, as a consequence, that references herein to the maintenance of the air currents through the tube and condenser are not to be taken in a strict and literal sense, but as based upon the assumption that the leakage, so far as the operation and advantages of construction are concerned, is a negligible constant.

The portion of the conveyer tube adjacent to the condensers is shown in the drawings as in the form of a rectangular trunk, but in the claims the term conveyer tube is intended to designate all portions of the conveyer through which a current of air and cotton passes regardless of their form.

Except where specified in the claims, the precise form of the apparatus used for introducing cotton is not material, since the invention may be embodied, in its broader aspects, in a mechanism in which any kind of introducing device is used which is capable of introducing cotton into the tube without affording a passage for air between the tube and the atmosphere. Similarly, the form of mechanism used in the condensers for separating the cotton from the air is immaterial, since the gist of the invention is not, in general, limited to the details of construction and operation shown and described, but may be embodied in other forms broadly defined in the claims.

I claim—

1. Cotton conveying apparatus, having, in combination, a pneumatic conveyer tube, means for creating a current of air therethrough, a condenser, a passage leading through the condenser and connected at either end with the tube, and means for simultaneously closing each end of the passage and opening the tube or opening each end of the passage and closing the tube, substantially as described.

2. Cotton conveying apparatus, having in combination, a pneumatic conveyer tube, a condenser connected at both inlet and outlet with the conveyer tube, means for opening or closing the conveyer tube between the inlet and outlet of the condenser, means for opening and closing the inlet to the condenser, a blower for creating a current of air in the conveyer tube and means for introducing cotton into the tube between the blower and the condenser, substantially as described.

3. Cotton conveying apparatus, having, in combination, a pneumatic conveyer tube, means for creating a current of air in the conveyer tube, means for introducing cotton into the tube, a condenser connected at both inlet and exhaust with the conveyer tube, a swinging gate operating to close alternatively the conveyer tube or the inlet to the condenser, and means for operating the said gate, substantially as described.

4. Cotton conveying apparatus, having, in combination, a pneumatic conveyer tube, means for creating a current of air in the tube, means for introducing cotton into the tube, a condenser connected with the tube at both inlet and exhaust, a swinging gate for opening and closing the inlet to the condenser, a swinging gate for opening and closing the exhaust from the condenser, and mechanical connections between the said gates whereby they may be simultaneously operated, substantially as described.

5. Cotton conveying apparatus, having, in combination, a pneumatic conveyer tube, means for creating a current of air in the tube, means for introducing cotton into the tube, a condenser connected with the tube at both inlet and exhaust, a swinging gate for opening and closing the inlet to the condenser, a rock shaft on which the gate is mounted, a cam member carried by the rock shaft, a swinging gate for closing the exhaust from the condenser and a rod pivotally connected with the latter gate and engaging the cam member whereby both gates may be closed simultaneously, substantially as described.

In testimony whereof I affix my signature, in presence of two witnesses.

HAVEN C. PERHAM.

Witnesses:
HORACE VAN EVEREN,
FARNUM F. DORSEY.